United States Patent [19]

Larson et al.

[11] Patent Number: 4,660,194
[45] Date of Patent: Apr. 21, 1987

[54] METHOD AND APPARATUS FOR TESTING A SUBSCRIBER'S LINE CIRCUIT IN A PACKET SWITCHED MULTIPLEXED DATA/VOICE COMMUNICATION SYSTEM

[75] Inventors: Carl A. Larson, South Hempstead; Hamid Modarressi, Roslyn Heights; John J. Moore, Islip, all of N.Y.

[73] Assignee: New York Telephone Company, New York, N.Y.

[21] Appl. No.: 597,061

[22] Filed: Apr. 5, 1984

[51] Int. Cl.⁴ .............................................. H04J 3/14
[52] U.S. Cl. .......................................... 370/15; 379/5
[58] Field of Search ................. 370/15; 179/175.3 R, 179/175.3 F, 175.31

[56] References Cited

U.S. PATENT DOCUMENTS

| | | | |
|---|---|---|---|
| Re. 27,864 | 1/1974 | Davis et al. | 179/2 DP |
| 1,445,759 | 2/1923 | Davidson, Jr. | 179/175.3 |
| 1,642,499 | 9/1927 | Jammer | 179/175.3 |
| 2,414,609 | 1/1947 | Rheubottom | 179/175.3 |
| 2,673,256 | 3/1954 | Molnar | 179/175.3 |
| 2,986,610 | 5/1961 | Maurushat, Jr. | 179/175.3 |
| 3,100,869 | 8/1963 | Disson et al. | 325/38 |
| 3,103,556 | 9/1963 | Nicholls et al. | 179/15 |
| 3,105,881 | 10/1963 | Maurushat, Jr. | 179/175 |
| 3,458,661 | 7/1969 | Forde et al. | 179/15 |
| 3,519,935 | 7/1970 | Hochgraf | 325/2 |
| 3,655,915 | 4/1972 | Liberman et al. | 179/175.3 R |
| 3,662,125 | 5/1972 | Haas, Jr. | 179/175.2 |
| 3,709,454 | 10/1973 | Liberman et al. | 370/15 |
| 3,739,107 | 6/1973 | Spencer | 179/175.3 |
| 3,790,723 | 2/1974 | Stewart | 179/175.3 |
| 3,819,878 | 6/1974 | Pine et al. | 179/175.3 |
| 3,822,367 | 7/1974 | Humphrey | 179/175.3 |
| 3,864,533 | 2/1975 | Erlund | 179/175.3 |
| 3,869,577 | 3/1975 | Couturier et al. | 179/2 DP |
| 3,912,882 | 10/1975 | Beerhaum | 179/175.3 |
| 3,916,331 | 10/1975 | Johnson, III et al. | 340/150 |
| 3,937,882 | 2/1976 | Bingham | 178/69.5 R |
| 3,943,305 | 3/1976 | Hagedorn | 179/175.3 R |
| 3,952,163 | 4/1976 | Couturier et al. | 179/15 BF |
| 4,002,847 | 1/1977 | Dail | 179/15 AL |
| 4,006,320 | 1/1977 | Märkl | 179/175.31 |
| 4,006,456 | 2/1977 | Wilk | 340/146.1 R |
| 4,039,751 | 8/1977 | Couturier et al. | 179/15 BF |
| 4,042,794 | 8/1977 | Lima | 179/175.3 |
| 4,055,808 | 10/1977 | Holsinger et al. | 325/67 |
| 4,064,369 | 12/1977 | Battocletti | 179/15 BF |
| 4,075,440 | 2/1978 | Laubengayer | 179/175.3 S |
| 4,112,414 | 9/1978 | Iscol et al. | 340/146.1 E |
| 4,127,816 | 11/1978 | Grosso | 325/67 |
| 4,187,415 | 2/1980 | Boutmy et al. | 179/175.3 F |
| 4,258,236 | 3/1981 | Conklin et al. | 179/175.3 R |
| 4,266,183 | 5/1981 | Steensma et al. | 324/52 |
| 4,317,010 | 2/1982 | Fillot | 179/175.31 R |
| 4,380,810 | 4/1983 | Canniff | 370/15 |
| 4,385,384 | 5/1984 | Rosbury | 371/22 |
| 4,529,979 | 2/1985 | Kusama et al. | 375/10 |

Primary Examiner—Joseph A. Orsino, Jr.
Attorney, Agent, or Firm—John J. Jordan; Thomas V. Heyman; Claire Ann Koegler

[57] ABSTRACT

In a packet switched multiplexed data/voice communication system, timed loopbacks along a subscriber line are effected by purposely extinguishing or killing the DATA carrier sewing the line.

38 Claims, 6 Drawing Figures

METHOD AND APPARATUS FOR TESTING A SUBSCRIBER'S LINE CIRCUIT IN A PACKET SWITCHED MULTIPLEXED DATA/VOICE COMMUNICATION SYSTEM

BACKGROUND OF THE INVENTION

This invention relates to packet switched multiplexed data/voice communication systems and, in particular, to a method and apparatus for testing a subscriber's line in such a system by establishing loopbacks at various locations along the line.

Packet switched multiplexed data/voice communication systems are being looked to by telephone operating companies as one way of providing an efficient, high quality DATA and voice frequency VF signal transport capability to their subscribers. In systems of this type, the DATA and VF signals from the subscriber data terminal equipment and the subscriber telephone set are multiplexed in a remote data/voice multiplexor at the subscriber location and the multiplexed signal is coupled onto the subscriber's telephone line or loop. In the telephone central office, a central office data voice multiplexor receives the multiplexed signal on the subscriber loop and acts to separate the VF and DATA signals. The VF signal is then terminated in a normal voice switch, while the DATA signal is fed to a statistical multiplexor. The statistical multiplexor assembles the signal into appropriate form for transmission to a packet switch which continues routing of the data in packetized form to its appropriate location.

Usually the packet switch is fed by a number of other statistical multiplexors and the system includes a number of packet switches of this type. Overall system control is provided by a network control center which is responsible for system maintenance, billing, data management and other supervisory functions.

For a packet switched multiplexed data/voice system of the above type to reach a large segment of existing telephone subscribers, it is essential that the system be designed in a way to reduce cost and complexity, while still maintaining the present high level of service. One way of reducing cost in such a system is to effect testing and maintenance of subscriber lines in a way which eliminates or minimizes the need for craft personnel. Thus, when testing a subscriber line for faults if the location of the faults can be isolated to different parts of the line without sending craft personnel out to investigate the entire line, considerble savings can be realized. Furthermore, if simple on-site diagnostic equipment can be provided at the subscriber end of the line, subscriber participation in testing becomes possible and any testing by craft personnel is facilitated.

Present day procedures for isolating faults along various sections of a transmission line depend upon the use of coded information, tones or other special signals. These signals provide a mechanism for developing loopbacks at various points on the line. The loopbacks, in turn, isolate segments of the line and, therefore, provide the desired fault location and isolation. In implementing the aforementioned loopback procedures, however, added signal generating and detecting equipment is required. This adds to the complexity of the system and reduces the gains which result from minimizing the need for craft personnel.

It is therefore an object of the present invention to provide a packet switched multiplexed data/voice communication system and method, and components thereof, for realizing subscriber line testing and maintenance in a manner which avoids the need for additional complex signal generating and detecting equipment.

It is a further object of the present invention to provide a packet switched multiplexed data/voice communication system and method, and components thereof, which permit line maintenance and testing, including fault location, through a unique loopback arrangement.

It is yet a further object of the present invention to provide an on-site diagnostic block for use in a packet switched multiplexed data/voice communication system.

SUMMARY OF THE INVENTION

In accordance with the principles of the present invention, the above and other objectives are realized in a system of the above type by an apparatus and method wherein timed loopbacks along a subscriber line are effected by purposely extinguishing or killing the DATA carrier serving the line. The DATA carrier is then restored, while the loopbacks are maintained. By properly adjusting the timing of the loopbacks, test signals transmitted down the line are returned by the loopbacks to provide an indication of the status of corresponding sections of the line.

By using the DATA carrier itself to effect the desired loopbacks, additional complex devices for developing and detecting encoded signals, and/or tone or other special signals are not needed. Instead, equipment already provided in the remote data voice multiplexor of the system for detecting DATA carrier failure can be inexpensively and simply adapted to this added purpose without seriously degrading overall system performance.

In a further aspect of the invention a diagnostic block is provided at the subscriber location. This block provides easily accessible indications of the status of various signals on the subscriber line and can be used by the subscriber and/or craft personnel as an aid when testing the line.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
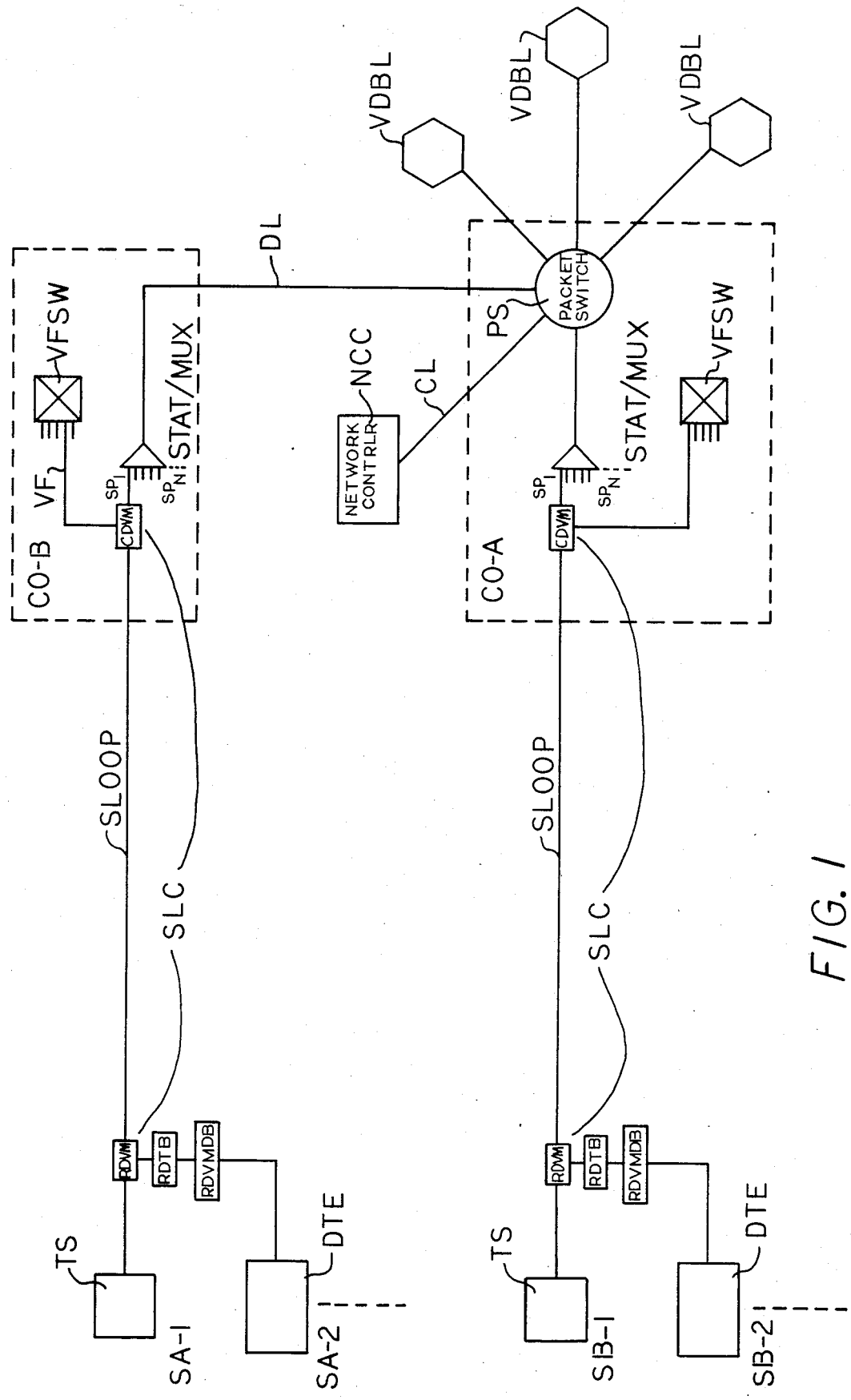
FIG. 1 shows a block diagram of a multiplexed data/voice packet switched communication system incorporating the maintenance and testing apparatus of the present invention.

FIG. 1 illustrates a multiplexed data/voice packet switched communication system 1 in accordance with the principles of the present invention. The system 1 provides data service for a plurality of central offices CO-A, CO-B each serving a large number of subscriber locations SA-1, SA-2, . . . SB-1, SB-2, . . .

Each subscriber location SA, SB is provided with a telephone set TS and data terminal equipment DTE. These devices are coupled to the respective central office CO serving the subscriber via a subscriber line circuit SLC. Each line circuit SLC includes at the subscriber location a remote data voice multiplexor RDVM which couples voice frequencies VF between the subscriber loop SLOOP and the telephone set TS and which couples DATA signals between the subscriber loop SLOOP and the data terminal equipment DTE.

The subscriber line circuit SLC also couples multiplexed DATA and VF signals between its respective remote data voice multiplexor RDVM and a central office data voice multiplexor CDVM. The latter multiplexor CDVM routes VF signals to a conventional voice frequency switch VFSW and DATA signals to an associated subscriber port SP of a statistical multiplexor STAT/MUX.

Each statistical multiplexor STAT/MUX multiplexes the DATA signals received from its corresponding subscriber line circuit SLC and routes the multiplexed data over a data line DL to a common packet switch PS located at one of the central offices. The packet switch PS, in turn, routes the DATA signals to appropriate locations which might be other subscriber locations and/or vendor data base locations VDBL and/or other networks.

The packet switch PS is controlled by a network control center NCC which communicates with the switch over a control line CL. Control center NCC provides overall system control in the form of a variety of maintenance, testing, accounting and billing functions.

To facilitate the maintenance and testing of the subscriber line circuits SLC of the system 1 by the network control center NCC a dedicated data link DDL is provided in the data line DL from the control center to each statistical multiplexor STAT/MUX. Each dedicated data link communicates with the so called "diagnostic port" DP of its respective statistical multiplexor STAT/MUX and enables the network control circuit NCC to test, via suitably encoded requests, the status of each of the multiplexor subscriber ports SP. This testing verifies the status of all control leads connecting a particular subscriber port under test to its associated central office data voice multiplexor CDVM, as well as initiates a software data loopback to determine the status of the multiplexor circuit path between the subscriber port SP and the multiplexor output on the data line DL side.

The aforementioned testing by the network control circuit NCC provides definitive status information as to each statistical multiplexor STAT/MUX and as to the control leads connecting each subscriber port SP with its associated central office data voice multiplexor CDVM. However, the status of the latter leads does not positively isolate the location on a subscriber line circuit SLC of a reported trouble or fault.

In accordance with the principles of the present invention, the system 1 is adapted to permit isolation of troubles or faults on each subscriber line circuit SLC in a manner which minimizes the complexity usually attached to this type of fault isolation. More particularly, each subscriber line circuit SLC is made to undergo timed loopbacks at various locations along the line and, in particular, at various locations along the DATA portion of the line at the subscriber location, by purposely killing or extinguishing the DATA carrier serving the line. Moreover, a remote data voice multiplexor diagnostic block RDVMDB is provided in each line to ensure that a loopback occurs just forward of the subscriber data terminal equipment DTE.

Purposely killing the DATA carrier to instigate loopbacks in the DATA portion of a subscriber's line (i.e., at the subscriber's RDVM and the RDVMDB) permits loopback realization without complexity and with minor modification to existing equipment. Thus, existing remote data voice multiplexors already have the capability of detecting DATA carrier status and, hence, with this existing capability can be used to initiate simple timing and gating circuits in the RDVM itself and in the RDVMDB to provide the desired loopbacks. Also, the presence of the subscriber RDVMDB just forward of the subscriber data terminal equipment DTE, enables a determination to be made that it is the data terminal equipment DTE and not the subscriber's line circuit that is responsible for a transmission fault.

Figure 2A:
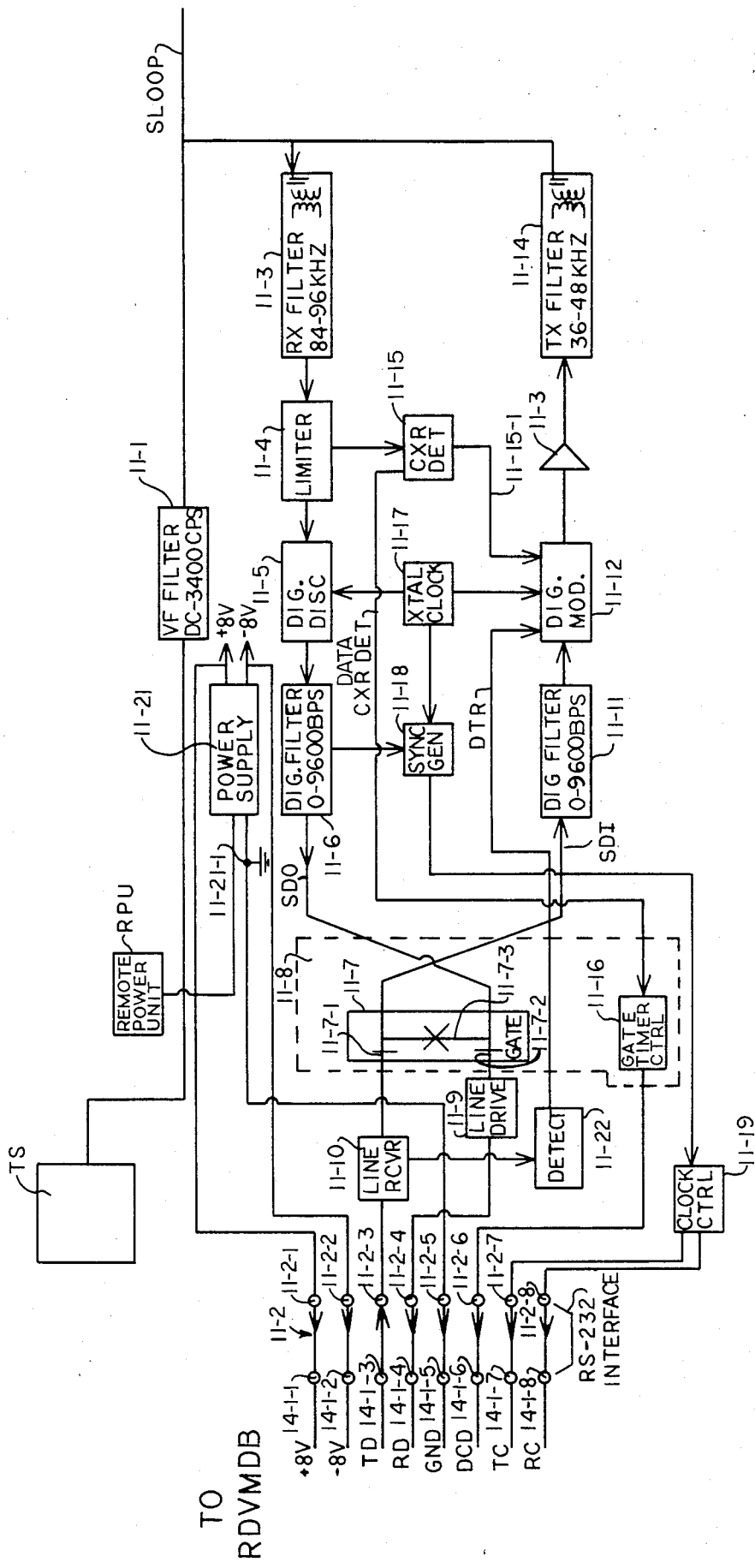
FIGS. 2A and 2B show the details of the remote data voice multiplexor and the remote data voice multiplexor diagnostic block, respectively, of the system illustrated in FIG. 1.
Figure 2B:
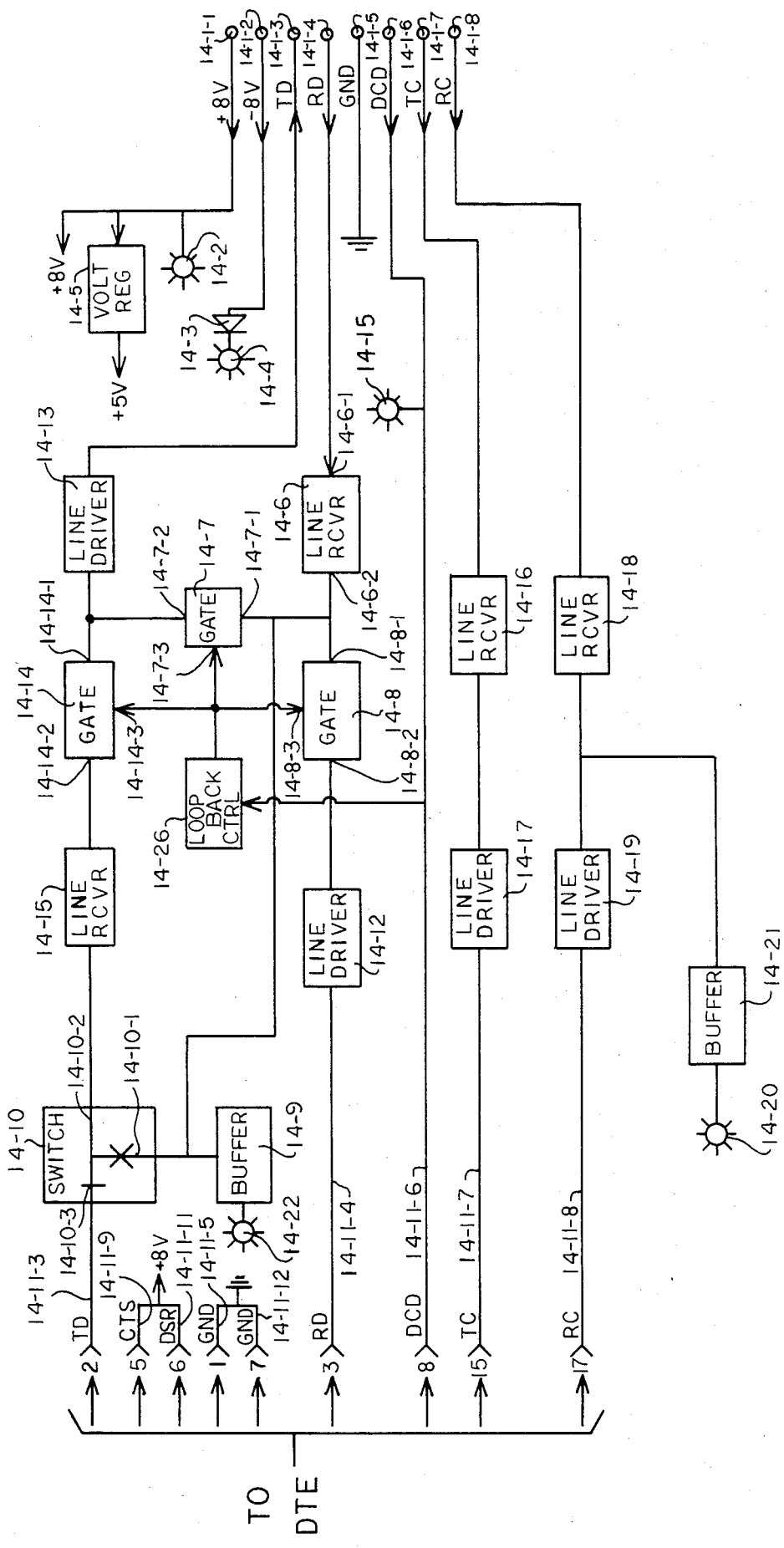

FIGS. 2A and 2B show in block diagram form a remote data voice multiplexor RDVM and a remote data voice multiplexor diagnostic block RDVMDB having loopback capability upon detection of DATA carrier loss. The RDVM comprises a voice frequency filter 11-1 which filters the VF signal (DC-3400 Hz) as it passes between the telephone set TS and the subscriber loop SLOOP. A standard RS-232 data terminal interface 11-2, in turn, interfaces the RDVM with the DTE through the RDVMDB. The interface 11-2 provides corresponding signals on its RDVM and DTE sides, the levels of these signals being set to insure compatability with the RDVM transmission and the DTE transmission, respectively. In particular, the interface has leads 11-2-1 through 11-2-8 on its RDVM side and corresponding leads 14-1-1 through 14-1-8 on its DTE sides. These corresponding pairs of leads carry, respectively, the following signals: +8 V DC; −8 V DC; transmit DATA TD; receive DATA RD; ground GND; data carrier detect DCD; transmit clock TC and receive clock RC.

Incoming modulated DATA signals from the subscriber loop SLOOP are filtered from the loop in a filter 11-3 to remove the received DATA carriers (84 KHz and 96 KHz frequency shift keyed (FSK) carriers). These carriers are demodulated via a limiter 11-4, a digital discriminator 11-5 and a digital filter (0–9600 BPS) 11-6. The resultant serial digital output signals SDO then pass through a first data path 11-7-2 of a gate 11-7 of a loopback circuit 11-8, through a line driver 11-9 to the lead 11-2-4 of the interface 11-2. Serial digital input signals SDI from the lead 11-2-3, in turn, are directed through a line receiver 11-10, a data path 11-7-1 of gate 11-7 and into a digital filter (0–9600 BPS) 11-11. After filtering, the signals enter digital modulator 11-12 where they are frequency shift keyed modulated onto one of two DATA carriers (36 KHz or 48 KHz) depending upon whether the signals are in one of digital state (space) or in another digital state (mark). Amplifier 11-13 then amplifies the resultant modulated signal and transmit filter 11-14 couples it to the subscriber loop SLOOP.

The modulator 11-12 also receives a signal on lead 11-15-1 from a received DATA carrier detect circuit 11-15 which reports the status of the received DATA carrier (i.e., whether the 84 KHz carrier, or the 96 KHz carrier is present) in the received modulated DATA signal developed by limiter 11-4. The carrier detect circuit 11-15 also provides a like received DATA carrier detect signal DATA CXR DET which gives carrier status to the gate timer control circuit 11-16 of the loopback circuit 11-8. The timer control circuit 11-16, in turn, controls the opening and closing of gate paths 11-7-1, 11-7-2 and 11-7-3, the latter path being closed, when the former two paths are open and vice versa.

A crystal clock 11-17 provides a clock signal to the digital discriminator 11-5, the digital modulator 11-12 and a synchronous generator 11-18 which also receives input from the digital filter 11-6. The generator 11-18 also provides an output signal to a clock control circuit 11-19 which develops receive and transmit clock signals and couples them to leads 11-2-8 and 11-2-7 of the interface 11-2.

DC power for the RDVM is provided by power supply 11-21 which develops +8 V and −8 V DC signals which are applied to leads 11-2-1 and 11-2-2 of the interface 11-2. The supply 11-21 receives AC power from a remote power unit RPU at the subscriber location and the supply ground 11-21-1 serves to ground the interface lead 11-2-5.

A data terminal equipment DTE state detector 11-22 monitors the transmitted DATA signal on lead 14-1-3 of the interface 11-2 through the line receiver 11-10. This detector provides a data terminal ready DTR signal to the digital modulator 11-12 for transmission through the system, as will be discussed in more detail below.

The RDVMDB leads are coupled directly to the control leads 14-1-1 to 14-1-8 of the interface 11-2. Leads 14-1-1 and 14-1-2 carrying the +8 v and −8 v DC signals, respectively, are monitored by a lamp 14-2 and by an inverter-lamp combination 14-3 and 14-4. The lead 14-1-1 also feeds a voltage regulator 14-5 which develops a regulated +5 V DC output which is used by logic gates.

The lead 14-1-4 carrying the received DATA signal RD is coupled to the input 14-6-1 of a line receiver 14-6. The output 14-6-2 of the line receiver, in turn, is coupled to one port 14-7-1 of a first gate 14-7, to one port 14-8-1 of a second gate 14-8, to a buffer 14-9 and to a contact 14-10-1 of a manual switch 14-10. A second port 14-8-2 of the gate 14-8 connects through a line driver 14-12 to couple the received DATA signal RD to a lead 14-11-4 of the RDVMDB, the latter lead 14-11-4 being connected to the terminal 3 of subscriber data terminal equipment DTE.

The lead 14-1-3 of the RDVMDB carrying the transmit DATA signal signal TD couples from a line driver 14-13 whose other end is connected to a further lead 14-7-2 of the gate 14-7 and to a lead 14-14-1 of an additional gate 14-14. A second lead 14-14-2 of the gate 14-14 connects to a line receiver 14-15 whose other end couples to a second contact 14-10-2 of the switch 14-10. A third contact 14-10-3 of the latter switch 14-10 connects to lead 14-11-3 carrying transmitted data TD from the terminal 2 of the DTE.

The data carrier detect signal DCD on lead 14-1-6 is monitored by a lamp 14-15 and connects to the input of a loop-back control circuit 14-26. The output of the latter serves as a control input to control ports 14-7-3, 14-8-3 and 14-14-3 of the gates 14-7, 14-8 and 14-14. The lead 14-1-6 also couples the DCD signal to lead 14-11-6 on the DTE side of the RDVMDB. The DTE terminal 8 connects to the latter RDVMDB lead 14-11-6.

The transmit clock TC and receive clock RC signals on leads 14-1-7 and 14-1-8 likewise connect to leads 14-11-7 and 14-11-8 on the DTE side. The lead 14-11-7 connects to the lead 14-1-7 through a path including line receiver 14-16 and line driver 14-17. Similarly, line receiver 14-18 and line driver 14-19 connect the lead 14-1-8 to the lead 14-11-8. A lamp 14-20 connected to a buffer 14-21 monitors the output of line receiver 14-18. A further lamp 14-22 monitors the buffer 14-9. The leads 14-11-7 and 14-11-8 of the RDVMDB connect to the DTE terminals 15 and 17, respectively.

The RDVMDB also includes clear to send CTS and data set ready DSR leads 14-11-9 and 14-11-11 which couple to a +8 V DC level. These leads are on the DTE side. Two further ground leads 14-11-5 and 14-11-12 are also on this side. The leads 14-11-9 and 14-11-11 connect to the terminals 5 and 6 of the DTE and the leads 14-11-5 and 14-11-12 connect to the terminals 1 and 7 of the DTE.

Figure 5:
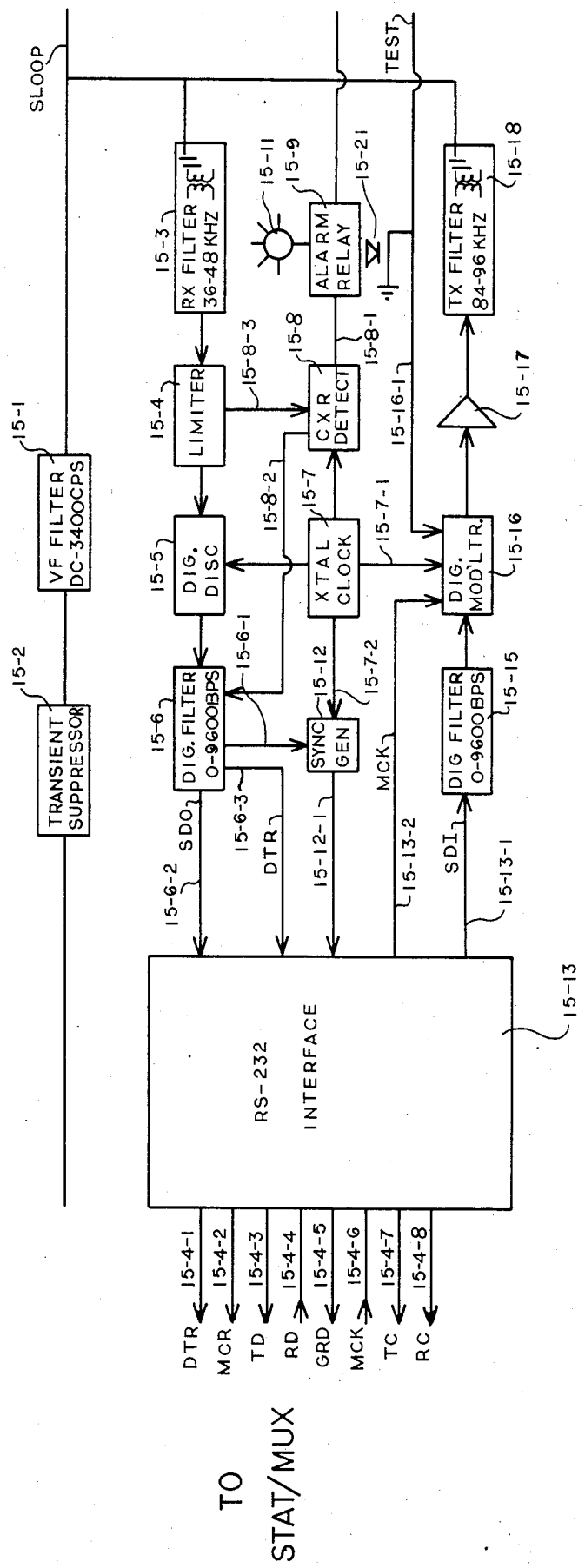
FIG. 5 shows the details of the central office data voice multiplexor and its interface with the statistical multiplexor shown in FIG. 1.

As above-indicated, the RDVM and RDVMDB circuits of FIG. 2 provide timed loopbacks upon killing of the DATA carrier (i.e., upon killing of the 84 KHz carrier or 96 KHz carrier) transmitted from their corresponding CDVM. FIG. 5 shows the details of a CDVM having this DATA carrier kill capability. The CDVM of FIG. 5 includes components analogous to those used in the RDVM and provides signals to and receives signals from the the STAT/MUX port and RDVM associated with its particular subscriber line circuit SLC.

More particularly, in the CDVM, VF signals are coupled between the subscriber loop SLOOP and the central office voice frequency switch VFSW by a voice frequency filter 15-1 and a transient suppressor 15-2. A filter 15-3, in turn, couples from the subscriber loop SLOOP the two DATA carriers (36 KHz carrier and 48 KHz carrier) transmitted by the RDVM and demodulates these carriers via a limiter 15-4, a digital discriminator 15-5 and a digital filter (0–9600 BPS) 15-6 to provide a serial data output signal SDO. The discriminator 15-5 operates under the control of a crystal clock 15-7 to demodulate the received DATA carriers from the RDVM.

The limiter 15-4 also provides a signal on line 15-8-3 to a received DATA carrier detect circuit 15-8 which reports DATA carrier presence (presence of the 36 KHz carrier or the 48 KHz carrier) via a line 15-8-1 to an alarm relay 15-9 and an associated lamp 15-11. The detect circuit 15-8 also provides an enabling signal on line 15-8-2 to digital filter (0–9600 BPS) 15-6 when received DATA carrier is present. Filter 15-6, in addition to the serial data out signal SDO, controls the data terminal ready signal DTR, which is at a high level except when the detect 15-8 signals loss of carrier, and also provides on line 15-6-1 a signal similar to the SDO signal for a synchronous generator 15-12. The synchronous generator in response to this and in response to a signal on line 15-7-2 from the clock 15-7 develops a synchronizing clock signal which is applied on line 15-12-1 to an RS-232 interface 15-13. The interface 15-13 also receives the SDO and DTR signals on lines 15-6-2 and 15-6-3.

In response to these signals, the interface couples the following signals to the corresponding subscriber port SP of the STAT/MUX: a transmit DATA signal TD on lead 15-14-3; a data terminal ready signal DTR on lead 15-14-1; a transmit clock signal TC on lead 15-14-7; a receive clock signal RC on lead 15-14-8; and a multiplexor carrier ready signal MCR on lead 15-14-2.

The RS-232 interface 15-13, in turn, receives from the subscriber port SP of the STAT/MUX a receive DATA signal RD on lead 15-14-4 and a multiplexor carrier kill signal MCK on lead 15-14-6. It is the latter signal which initiates killing of the DATA carrier to the RDVM, as will be explained more fully below.

The RD signal is coupled by the interface 15-13 to the line 15-13-1 as a serial data input signal SDI for a digital filter (0-9600 BPS) 15-15. The filter output is applied to a digital modulator 15-16 which is also fed via line 15-7-1 by the clock 15-7. The modulator is enabled or disabled by the MCK signal which is coupled by the interface to line 15-13-2 and can be further disabled by closing test switch 15-21 which connects the TEST signal on line 15-16-1 to the modulator. The output of the modulator containing the FSK DATA carrier frequencies (84 KHz for a space and 96 KHz for a mark) is passed through an amplifier 15-17, a transmit filter 15-18 and from there to the subscriber loop SLOOP for coupling to the corresponding RDVM.

If the sytem of FIG. 1 is functioning properly with respect to any subscriber location, SA, SB the RDVM associated with that location will be transmitting a DATA carrier at one of its frequencies (either 36 KHz or 48 KHz) which will be received by the corresponding CDVM. The CDVM, in turn, will be transmitting a DATA carrier at one of its frequencies (either 84 KHz or 96 KHz) which will be received by the RDVM. Under these circumstances, the DATA CXR DET signal and the signal on lead, 11-15-1 in the RDVM will be registering the appearance of a received DATA carrier. Modulator 11-12 is thus in its enabled state and gate timer control 11-16 is in its disabled state which causes paths 11-7-2 and 11-7-1 of gate 11-7 to be closed and path 11-7-3 to be open. Also, the disabled state of the control 11-16 causes the DCD signal on lead 11-2-6 to be high. This, in turn, disables loopback control 14-26 which causes gates 14-14 and 14-8 to be closed and gate 14-7 to be open in the RDVMDB. No loopback paths are thus established in the RDVM or RDVMDB and DATA is thus able to flow between the CDVM and the DTE.

If the terminal equipment DTE is also functioning properly at this time, detector 11-22 will be providing a DTR signal to modulator 11-12 indicative of this status. At the CDVM, the received DATA carrier detect circuit 15-8 will be receiving DATA carrier from the RDVM including the DTR signal. Alarm relay 15-9 will thus be disabled and filter 15-6 enabled by the DATA carrier detect signals on lines 15-8-1 and 15-8-2. The filter will pass the DTR signal to the interface 15-13 which, in turn, will convey the DTR signal and the MCR signal via lines 15-14-1 and 15-14-2 to the STAT/MUX subscriber port SP. These signals indicate proper operation of the carrier path between the RDVM and the CDVM and proper operation of the DTE to the STAT/MUX. The STAT/MUX will report this to the network control center via the STAT/MUX diagnostic port DP, data line DL and packet switch PS.

If a fault or trouble should now occur either in the RDVM itself or in the subscriber loop SLOOP connecting the RDVM and CDVM or in the CDVM itself, resulting in loss of DATA carrier in the CDVM-RDVM direction this will result in loss of DATA carrier in the other direction. Thus, no received DATA carrier will be present at the RDVM or CDVM. Loss of DATA carrier in the RDVM-CDVM direction at the CDVM will result in the DATA carrier detect circuit 15-8 changing the status of its signals on lines 15-8-1 and 15-8-2. The change in signal on line 15-8-1 causes activation of the alarm relay 15-9 and the lighting of lamp 15-11 indicating loss of received DATA carrier at the CDVM. Also, the MCR signal on lead 15-4-2 of the interface 15-13 will go low indicating to the STAT/MUX loss of received DATA carrier. The STAT/MUX, in turn, reports this loss to the network control center NCC via its diagnostic port DP, the data line DL and the packet switch PS.

At the network control center NCC, the reported loss of received DATA carrier at the CDVM will be understood by the attendant as indicating trouble in the CDVM, the subscriber loop SLOOP or the RDVM of the subscriber line circuit SLC associated with the STAT/MUX subscriber port SP reporting the loss. The attendant can then request the central office personnel to test the CDVM and then the SLOOP from the central office. If these tests prove positive, the problem will then be isolated to the RDVM.

If a trouble or fault should occur, but the MCR lead in the CDVM of the line reporting the fault does not change state, the attendant at the network control center NCC will know that there has been no loss of DATA carrier between the RDVM and CDVM and thus will then have reason to believe that the trouble or fault lies in the portion of the subscriber line circuit SLC from the RDVM interface to the DTE. The attendant will then institute testing of this portion of the subscriber line circuit by the above-discussed procedure of creating loopbacks in the line circuit through purposely killing the DATA carrier being transmitted from the CDVM to the RDVM.

More particularly, the attendant will transmit a message from the network control center NCC over the dedicated data link through the packet switch PS to the diagnostic port DP of the statistical multiplexor STAT/MUX serving the subscriber line circuit SLC reporting the fault. Upon receiving this message, the STAT/MUX identifies the subscriber line circuit SLC to be tested and its associated STAT/MUX port SP and then changes the state of the multiplexor carrier kill signal MCK on lead 15-14-6 connecting that port to its associated CDVM. In particular, the MCK lead is made to go low for a first carrier kill interval (e.g., 4 seconds).

In response to this low state of the MCK signal on lead 15-4-6, the modulator 15-16 of the CDVM extinguishes transmission of its DATA carrier so that there is a loss of DATA carrier on the subscriber loop SLOOP. This loss of DATA carrier is detected by the received DATA carrier detect circuit 11-15 in the RDVM and the circuit 11-15 reacts to this loss by changing the state of the signal DATA CXR DET. This, in turn, enables gate timer control 11-16 and a two step clock-driven timer in the gate timer control begins timing.

If the carrier loss goes beyond a predetermined safety period (e.g. 150 milliseconds), the gate timer control 11-16 causes the DCD signal on lead 11-2-6 of the interface 11-2 to go low. Also, after the safety interval, the signal on the lead 11-2-1 also changes state (goes low) due to the loss in DATA carrier causing the modulator 11-12 to remove its transmit DATA carrier.

These conditions persist until the received DATA carrier detect signal DATA CXR DET and the signal on line 11-15-1 in the RDVM again change state. This occurs at the end of a first predetermined carrier kill interval when the DATA carrier is brought up at the CDVM. In particular, at this time, the programming in the STAT/MUX as established by the message from the network control center causes a change in state of the MCK signal on lead 15-14-6, thereby enabling the modulator 15-16.

The restoration of DATA carrier from the CDVM causes the signal on line 11-15-1 of the RDVM to again change state so that the modulator 11-12 turns on and DATA carrier is again supplied by the RDVM. Also, at the end of the first carrier kill interval, the timer in the gate control circuit 11-16 opens the signal paths 11-7-2 and 11-7-1 and closes the signal path 11-7-3 in the gate 11-7. This causes a loopback of the SDO signal so it becomes the SDI signal and is transmitted back to the CDVM. This loopback at the RDVM interface with the RDVMDB lasts for a first loopback interval (e.g. 30 seconds) under the control of circuit 11-16.

When the lead 11-2-6 of the interface 11-2 goes low as described above, the lead 14-1-6 in the RDVMDB also goes low, causing the control lead 14-1-6 of the loopback control circuit 14-26 to go low. This triggers the control circuit 14-26 (a 555 one-shot) causing the control leads 14-7-3, 14-8-3 and 14-14-3 to change state. Gates 14-8 and 14-14 thereby open and gate 14-7 closes. A loopback at the RDVMDB through gate 14-7 is thus created at the RDVMDB and after the first carrier kill interval, it continues under the control of circuit 14-26 for a second loopback interval (e.g. 90 seconds), at which time the control circuit 14-26 restores the gates 14-7, 14-8 and 14-14 to their original conditions.

As can be appreciated, by extinguishing the DATA carrier from the CDVM to the RDVM for a first carrier kill interval (4 seconds), the attendant at the network control center NCC has created loopback conditions in the corresponding RDVM and RDVMDB for longer loopback intervals (30 and 90 seconds, respectively). Testing of the data portion of the subscriber line circuit SLC at the subscriber location can now be carried out during these loopback intervals.

Figure 3:
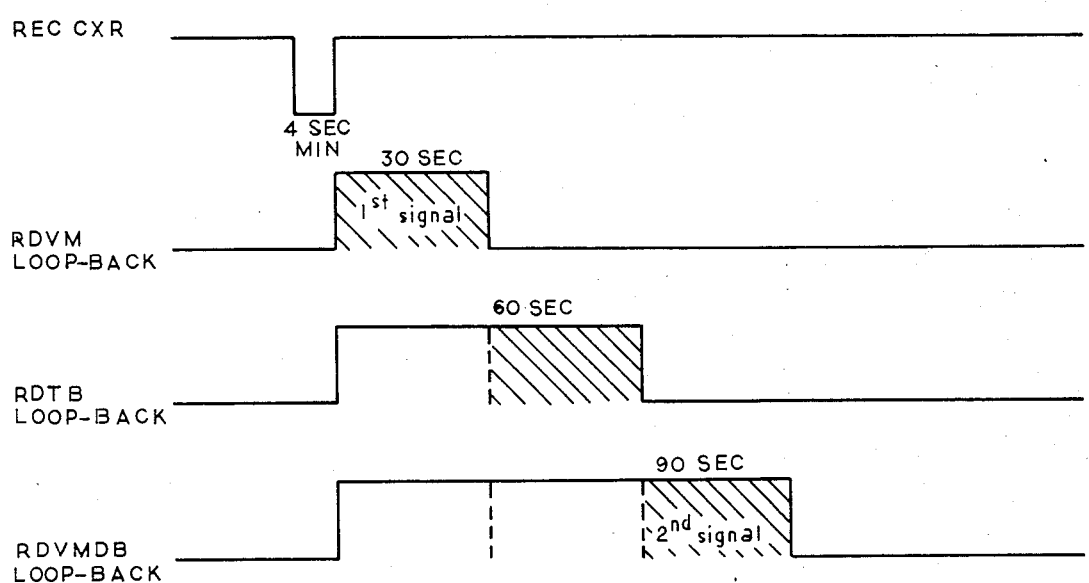

In particular, once the STAT/MUX has raised the MCK lead causing the CDVM to again transmit DATA carrier (i.e., after the first carrier kill interval), the STAT/MUX under control of the attendant at the network control center NCC provides two different DATA test signals to the CDVM. One test signal is transmitted by the CDVM during the first loopback interval and the other during the portion of second loopback interval which does not overlap with the first interval. This is illustrated in FIG. 3 which shows the loopback intervals in relation to the first carrier kill interval and the portions of each loopback interval for sending the test signals.

The first and second test signals are carried from the CDVM through the SLOOP to the RDVM. At the RDVM, the first test signal is looped back, while second test signal continues to the RDVMDB where it is looped back. Both test signals are thus returned to the STAT/MUX via the subscriber loop SLOOP and the CDVM and are compared with the signals as originally sent. If both signals compare favorably, this means that the DATA path of the subscriber line circuit SLC under test is operative up to the DTE interface. If the signal corresponding to the first loopback interval compares favorably only, this means that the DATA path is good to the RDVM, but that the trouble lies in the path from the RDVM to the DTE. On the other hand, if neither test signal compares favorably, then the trouble is in the RDVM.

In some situations, the subscriber locations SA, SB might be such that the RDVM might have to be placed sufficiently far from the RDVMDB as to require the received and transmitted DATA signals RD and TD to be amplified or regenerated. Such amplification can be provided by interposing a repeater data terminal block (RDTB) between the RDVM and the RDVMDB as shown in FIG. 1. The RDTB can have the same circuit configuration as the RDVMDB, except that certain components such as, for example, lamps 14-15, 14-22 and 14-20 and switch 14-10, may be eliminated.

In cases where the repeater block RDTB is used, a timed loopback initiated by killing the received DATA carriers at the RDVM can also be created at this block during the loopback testing procedure of the subscriber line circuit SLC. Thus, a loopback interval between the first and second intervals (e.g., a 60 second interval) can be instituted for this block in a similar manner as in the RDVMDB upon the DCD lead of the interface 11-2 going low. In this case, there would be three loopback intervals corresponding to loopbacks at the RDVM, the RDTB and the RDVMDB, respectively. FIG. 3 also shows the timing diagram for effecting a loopback at the RDTB. If the RDTB is used the areas of the intervals for transmitting test signals will be as shown by the cross hatched areas in FIG. 3.

Figure 4:
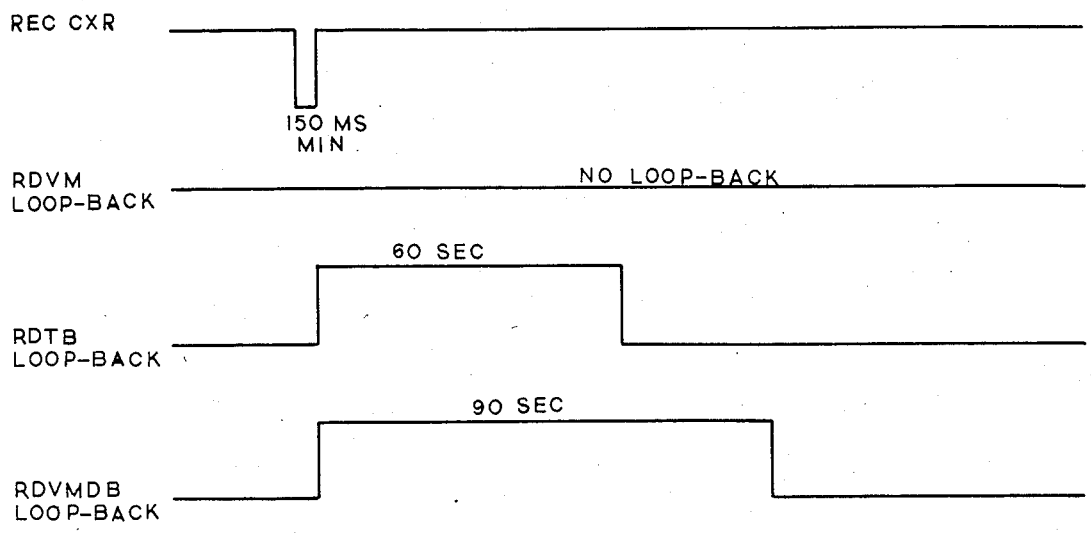
FIGS. 3 and 4 illustrate the timing diagrams for two loopback diagnostic sequences for the system of FIG. 1.

It is also possible to modify the test procedure described above so that only the equipment between the RDVM and the DTE is tested, that is only the RDTB and RDVMDB are tested. This can be realized by extinguishing the DATA carrier to the RDVM for a period which is less than the first carrier kill interval (4 seconds) but greater than the safety interval i.e., greater than (150 milliseconds). In this situation, the DCD lead 11-2-6 of the interface will go low causing loopbacks at the RDTB and RDVMDB. However, the gate timer control 11-16 in the RDVM will not register loss of received DATA carrier for the first carrier kill interval so that the signal to gate 11-7 will not change state. The circuit paths 11-7-1 and 11-7-2 will thus remain closed and the path 11-7-3 open and no loopback will occur at the RDVM interface. FIG. 4 shows the timing diagrams for this loopback sequence.

The RDVMDB as shown in FIG. 2B has features, in addition to its loopback capability, which give it additional diagnostic value. Thus, the lamps 14-2, 14-15, 14-22, 14-20 give immediate visual indication of the status of the DC power, the received DATA carrier, the received data signal RD and the received clock signal RC, respectively, in the subscriber circuit SLC. The lamp 14-4, in turn, when lit indicates transposition of the connections to the RDVM and is of value when installing the RDVMDB. More particularly, the connnection of the RDVMDB to the RDVM is to be made through two standard telephone quads, each of which contains four colored wires. In installation, if these two quads are transposed, the lamp 14-4 will light to indicate the transpositions. The switch 14-10 in the RDVMDB also enables a manual loopback to be effected at this point. Thus with a switch 14-10 in the test position (contact 14-10-3 open and contact 14-10-1 closed), a manual loopback of the received data occurs for as long as the switch remains in this position.

These additional diagnostic features enable further tests to be conducted from the network control circuit NCC with cooperation of the subscriber who can report the conditions of lamps 14-2, 14-15, 14-22 and 14-20 and effect a manual loopback. With this cooperative effort, and by using repeated loopback instructions to the statistical multiplexor STAT/MUX, the attendant conducting the testing at the network control center NCC can diagnose the problem from the network control center, thus precluding the need for sending a craftsman to the subscriber location. Thus, for example, if the power lamp 14-2 indicates a fault condition, the trouble could very well be loss of power to the RDVM. This lamp condition could be recognized by the subscriber and relayed by the subscriber to the attendant conducting the testing at the network control circuit. The attendant could then advise the subscriber that the trouble could very well be a failure to plug in the AC source to the RDVM. This condition could easily be verified by the user and the condition cleared.

As above mentioned, the RDVM provides a DTR signal which is transmitted through the system to the network control center NCC to advise the center whether the DTE is operating properly. The DTR signal is generated by the detector 11-22 in the RDVM by monitoring the transmitted data signal TD. This detector provides a change in state of the DTR lead indicating trouble in the DTE if the transmitted data is always of one particular state, which is an unpermitted condition. Thus, for example, if the DTE in quiescent state transmits data having only a first state (mark) and in operative state transmits data having a first state (mark) and a second state (space), by designing the detector 11-22 to detect whether the DTE is providing all second state transmission only, the detector will recognize that the DTE is not transmitting data or in its appropriate quiescent state. Under this condition, the detector 11-22 will cause, via the DTR signal, the digital modulator 11-12 to send a continuous space frequency to the CDVM. This is noted by the CDVM which causes the DTR signal to the STAT/MUX to be dropped. The latter, in turn, is recognized by the STAT/MUX which reports the faulty operating condition of the DTE to NCC.

The network control center NCC of FIG. 1 can typically be provided by suitably programmed computers. Thus, for example, Zilog Z8000/21 computers connected to a redundant pair of Siemans PDP 11/24 computers and a Siemans Network Node/Front End consisting of a pair of 11/44 processors can be used as the hardware for the network control center. Each packet switch PS, in turn, might be a Western Electric #1 PSS. Such a switch includes a 3B Model 20 duplex processor arrangement, with standard peripherals, specially designed Facility Interface processors and is designed to provide a data switching capability between customer access lines or between customer access lines and trunks connected to other packet switches.

Each STAT/MUX can be a standard Databit ANP 2520 statistical multiplexor programmed to provide the functions and signals discussed above. Each CDVM and RDVM, in turn, can be a standard Seiscor Integrated Data/Voice Carrier system IDVC-9600 into which has been incorporated the additional loopback equipment illustrated in the drawings.

In all cases, it is understood that the above-described arrangements are merely illustrative of the many possible specific embodiments which represent applications of the invention. Numerous and varied other arrangements can readily be devised in accordance with the principles of the present invention without departing from the spirit and scope of the invention.

What is claimed is:

1. A multiplexed data voice communication system comprising:
    a plurality of subscriber locations, each including:
    voice frequency equipment for transmitting and receiving first and second VP signals, respectively;
    DATA terminal equipment for transmitting and receiving first and second DATA signals, respectively;
    a central office for transmitting said second VF signals and second DATA signals and for receiving said first VF signals and said first DATA signals;
    and subscriber line circuits, each coupling first and second VF signals and DATA signals between a different subscriber location and the central office and each including:
    a remote DATA voice multiplexor for forming a first VF DATA multiplexed signal;
    a central office DATA voice multiplexor for forming a second VF DATA multiplexed signal; and
    a subscriber loop for coupling the first and second multiplexed VF DATA signals between the remote DATA voice multiplexor and the central office DATA voice multiplexor;
    said remote DATA voice multiplexor comprising:
    means for modulating said first DATA signals received from the DATA terminal equipment at the subscriber location to form a first DATA carrier;
    means for combining the first DATA carrier and the first VF signals at the subscriber location to form said first VF DATA multiplexed signal;
    means for separating the second VF DATA multiplexed signal received from said central office DATA voice multiplexor into a second DATA carrier and second VF signals for the voice frequency equipment at the subscriber location;
    and means for demodulating the second DATA carrier to produce said second DATA signals for the DATA terminal equipment at the subscriber location; and
    said central office DATA voice multiplexor comprising:
    means for separating the first VF DATA multiplexed signal received from said remote DATA voice multiplexor into the first VF signals and the first DATA carrier;
    means for demodulating the first DATA carrier to recover said first DATA signals;
    means for modulating the second DATA signals to form the second DATA carrier;
    and means for combining the second DATA carrier and the second VF signals to produce the second VF DATA multiplexed signal;
    and each said subscriber line circuit further including:
    means for extinguishing the second DATA carrier for a first preselected period of time;
    and means for creating one or more loopbacks at preselected different locations between the subscriber loop and the DATA terminal equipment for preselected different loopback intervals which terminate subsequent to said first preselected period upon the extinguishing of said second DATA carrier for said first preselected period.

2. A system in accordance with claim 1 wherein:
    each said remote DATA voice multiplexor further comprises:

means for detecting the state of said first DATA signals and for providing a DATA terminal faulty signal when said first DATA signals are all of a first state which is indicative of a faulty condition in said DATA terminal equipment;

the state detecting means in each remote DATA voice multiplexor couples the DATA terminal faulty signal generated by the state detecting means to the modulating means of the corresponding remote DATA voice multiplexor to generate a first frequency signal indicative of said DATA terminal faulty signal;

and the demodulating means of each central office DATA voice multiplexor recognizes the first frequency signal transmitted from the corresponding remote DATA voice multiplexor and generates a corresponding DATA terminal faulty signal in response thereto.

3. A system in accordance with claim 1 wherein:

each said extinguishing means is adapted to continue the extinguishment of said second DATA carrier beyond said first preselected period of time until a second preselected period of time is reached;

each said loopback means creates one or more further loopbacks along the corresponding subscriber line circuit upon the extinguishing of said second DATA carrier for said second preselected period;

and said loopback intervals terminate subsequent to said second preselected period.

4. A system in accordance with claim 3 wherein:

each subscriber line circuit further includes:

a remote DATA voice multiplexor diagnostic block disposed between the corresponding remote DATA voice multiplexor and the corresponding DATA terminal equipment of the subscriber line circuit, said diagnostic block including first and second paths for coupling said first and second DATA signals respectively between the corresponding DATA terminal equipment and the corresponding remote DATA voice multiplexor;

each said loopback means creates a loopback at the corresponding diagnostic block of the subscriber line circuit by coupling the first and second paths of the diagnostic block and by decoupling the first and second paths of the diagnostic block from the corresponding DATA terminal equipment for a first preselected loopback interval;

and each said loopback means creates a further loopback at the corresponding remote DATA voice multiplexor by coupling the second DATA signals recovered by the demodulating means of the remote DATA voice multiplexor to and decoupling the first DATA signals from the modulating means of the remote DATA voice multiplexor for a second preselected loopback interval which terminates prior to the first loopback interval.

5. A system in accordance with claim 4 wherein:

each subscriber line circuit further includes:

a remote DATA voice repeater block disposed between the corresponding remote DATA voice multiplexor and the remote DATA voice multiplexor diagnostic block of the subscriber line for regenerating the first and second DATA signals coupled therebetween, said repeater block including a first path for said first DATA signals and a second path for said second DATA signals;

and each said loopback means creates a loopback at the corresponding repeater block of the subscriber line circuit by coupling the first and second paths of the repeater block and by decoupling the first and second paths of the repeater block from the corresponding remote DATA voice multiplexor diagnotic block for a third preselected loopback interval which terminates prior to and subsequent to said first and second loopback intervals, respectively.

6. A system in accordance with claim 5 wherein:

said central office further includes:

means for generating a first test signal during said second loopback interval, a second test signal after said second loopback interval and during said third loopback interval, and a third test signal after said third loopback interval and during said first loopback interval.

7. A system in accordance with claim 1 wherein:

each said extinguishing means of a subscriber line circuit is in the corresponding central office DATA voice multiplexor and is responsive to a carrier kill signal.

8. A system in accordance with claim 7 wherein:

each said central office includes means for generating said carrier kill signal.

9. A system in accordance with claim 7 wherein:

each said central office includes:

a statistical multiplexor for: producing a first DATA multiplexed signal from said first DATA signals and transmitting said first DATA multiplexed signal onto a DATA line; for demultiplexing a second DATA multiplexed signal containing said second DATA signals received from the DATA line to provide said second DATA signals; for generating a carrier kill signal for a corresponding subscriber line circuit in response to signals from said DATA line;

and means for coupling the carrier kill signal corresponding to a subscriber line circuit to the modulating means of the corresponding central office DATA voice multiplexor.

10. A system in accordance with claim 9 further including:

a DATA line coupling said statistical multiplexor to a packet switch;

a packet switch for receiving said first DATA multiplexed signal from and transmitting said second DATA multiplexed signal to said DATA line;

and a network control center for controlling operation of said packet switch and statistical multiplexor.

11. A system in accordance with claim 9 wherein:

each said remote DATA voice multiplexor further comprises:

means for detecting the state of said first DATA signals and for providing a DATA terminal faulty signal when said first DATA signals are all of a first state which is indicative of a faulty condition in said DATA terminal equipment;

the state detecting means in each remote DATA voice multiplexor couples the DATA terminal faulty signal generated by the state detecting means to the modulating means of the corresponding remote DATA voice multiplexor to generate a first frequency signal indicative of said DATA terminal faulty signal;

and the demodulating means of each central office DATA voice multiplexor recognizes the first frequency signal transmitted from the corresponding remote DATA voice multiplexor and generates a corresponding DATA terminal faulty signal in response thereto.

12. A system in accordance with claim 11 wherein:
each statistical multiplexor is responsive to the DATA terminal faulty signals generated by the demodulating means of the corresponding central office DATA voice multiplexors.

13. A remote DATA-voice multiplexor which receives first DATA signals and first VF signals and which receives a second multiplexed VF DATA signal including second VF signals and a second DATA carrier, said multiplexor comprising:
means for modulating said first DATA signals onto a carrier to produce a first DATA carrier;
means for combining said first DATA carrier and said first VF signals to form a first VF DATA multiplexed signal;
means responsive to said second VF DATA multiplexed signal for separating said second VF signals from said second DATA carrier;
means for demodulating said second DATA carrier to recover second DATA signals;
means responsive to said separated second DATA carrier for detecting the loss of said second DATA carrier for a first preselected period of time and for a second preselected period of time greater than said first preselected period;
and means responsive to said detecting means for coupling said second DATA signals to and decoupling said first DATA signals from said modulating means to create a loopback for a preselected loopback interval upon detection of loss of said second DATA carrier for said second preselected period of time.

14. A multiplexor in accordance with claim 13 wherein:
said modulating means is responsive to said detecting means and is disabled upon detection of loss of said second DATA carrier for said second preselected period.

15. A remote DATA voice multiplexor in accordance with claim 13 further comprising:
means for detecting the state of said first DATA signals and for providing a DATA terminal faulty signal when said first DATA signals are all of a first state which is indicative of a faulty condition in the DATA terminal equipment generating the first DATA signals;
and said modulating means is responsive to said DATA terminal faulty signal to generate a first frequency signal indicative thereof.

16. A multiplexor in accordance with claim 13 wherein:
said coupling and decoupling means provides a signal indicative of second DATA carrier loss after detection of second DATA carrier loss for said first preselected period;
and said multiplexor includes an output terminal for providing said signal to equipment external of said multiplexor.

17. A multiplexor in accordance with claim 16 where said coupling and decoupling means comprises:
a gate circuit including: a first DATA path having first terminal for receiving said first DATA signals, said first path being connected to said modulating means; a second DATA path connected to said demodulating means for delivering said second DATA signals to a second terminal; and a third DATA path connecting said first and second DATA paths;
and control means responsive to the detecting of the loss of second DATA carrier by said detection means for said second preselected period for closing said third DATA path and for opening said first and second DATA paths for said first loopback interval, said opening of said first DATA path being at a point between said first terminal and the point of connection of said first DATA path to said third DATA path and the opening of said second DATA path being at a point between said second terminal and the point of connection of said second DATA path to said third DATA path, said control means providing said signal indicative of second DATA carrier loss after said first preselected period.

18. A central office DATA voice multiplexor which receives a first VF DATA multiplexed signal from a remote DATA voice multiplexor and receives second DATA signals from a statistical multiplexor and second VF signals, said central office DATA voice multiplexor comprising:
means for separating said first VF DATA multiplexed signal to recover a first DATA carrier and first VF signals;
means for demodulating said first DATA carrier to recover first DATA signals;
means for modulating said second DATA signals to produce a second DATA carrier;
means for combining the second DATA carrier and the second VF signals to produce a second VF DATA multiplexed signal;
means responsive to said separated first DATA carrier for detecting the loss of said first DATA carrier;
and means responsive to said detecting means for providing a signal to the statistical multiplexor indicative of first DATA carrier loss.

19. A central office DATA voice multiplexor in accordance with claim 18, further comprising:
means responsive to said detection means for providing an alarm indicative of first DATA carrier loss.

20. A central office DATA voice multiplexor in accordance with claim 19, further comprising:
means responsive to a signal from the statistical multiplexor for disabling said modulating means for a first preselected interval;
and means adapted to receive said disabling signal from the statistical multiplexor.

21. In combination a DATA voice multiplexor diagnostic block and a remote DATA voice multiplexor which receives first DATA signals, first VF signals, and a second multiplexed VF DATA signal including second VF signals and a second DATA carrier;
said remote DATA voice multiplexor comprising:
means for modulating said first DATA signals onto a carrier to produce a first DATA carrier;
means for combining said first DATA carrier and said first VF signals to form a first VF DATA multiplexed signal;
means responsive to said second VF DATA multiplexed signal for separating said second VF signals from said second DATA carrier;
means for demodulating said second DATA carrier to recover second DATA signals;

means responsive to said separated second DATA carrier for detecting the loss of said second DATA carrier for a first preselected period of time and for a second preselected period of time greater than said first preselected period; and means for generating a signal indicative of second DATA carrier loss for said first preselected period of time; and said diagnostic block comprising:

first input and output terminals and a first path therebetween for coupling said first DATA signals from DATA terminal equipment to the remote DATA voice multiplexor;

second input and output terminals and a second path therebetween for coupling said second DATA signals from the remote DATA voice multiplexor to DATA terminal equipment;

a third path for selectively connecting said first and second paths; and means responsive to the signal from the remote DATA voice multiplexor indicative of loss of said second DATA carrier for said first preselected period of time, said means closing said third path and opening said first and second paths to create a loopback for a first preselected loopback interval upon loss of said second DATA carrier for said first preselected period.

22. A combination in accordance with claim 21, said remote DATA voice multiplexor further including:

means responsive to said detecting means for coupling said second DATA signals to and decoupling said first DATA signals from said modulating means to create a loopback for a preselected loopback interval upon detection of loss of said second DATA carrier for said second preselected period of time.

23. A combination in accordance with claim 21 wherein:

said means for opening and closing in said diagnostic block includes a third input terminal adapted to receive said signal indicative of the loss of said second DATA carrier.

24. A combination in accordance with claim 23 wherein:

said means for opening and closing in said diagnostic block includes: first, second and third gates in said first, second and third paths, respectively; and loopback control means responsive to the signal on said third terminal for controlling the opening and closing of said gates.

25. A diagnostic block in accordance with claim 24, said diagnostic block further including:

manually operable switch means for coupling said first and second paths and for decoupling the signal applied to said first terminal from said first path when said switch is moved to a first position.

26. A combination in accordance with claim 25, said diagnostic block further including:

first lamp means for monitoring the second DATA signals.

27. A combination in accordance with claim 26, said diagnostic block further including:

second lamp means for monitoring the signal applied to said third input terminal.

28. A combination in accordance with claim 27, said diagnostic block further including:

fourth and fifth input terminals for receiving positive and negative DC signals;

third lamp means for monitoring the DC signals received by said fourth input terminal;

means for inverting the DC signal received on said fourth terminal; and fourth lamp means for monitoring said inverted signal.

29. A combination in accordance with claim 28, said diagnostic block further including:

sixth and seventh terminals adapted to receive transmit and receive clock signals;

and fifth lamp means for monitoring said receive clock signal on said seventh terminal.

30. A method of testing a multiplexed data voice communication system, the system comprising:

a plurality of subscriber locations, each including:

voice frequency equipment for transmitting and receiving first and second VF signals, respectively;

DATA terminal equipment for transmitting and receiving first and second DATA signals, respectively;

a central office for transmitting said second VF signals and second DATA signals and for receiving said first VF signals and said first DATA signals;

and subscriber line circuits, each coupling first and second VF signals and DATA signals between a different subscriber location and the central office and each including:

a remote DATA voice multiplexor for forming a first VF DATA multiplexed signal;

a central office DATA voice multiplexor for forming a second VF DATA multiplexed signal; and a subscriber loop for coupling the first and second multiplexed VF DATA signals between the remote DATA voice multiplexor and the central office DATA voice multiplexor;

said remote DATA voice multiplexor comprising:

means for modulating said first DATA signals received from the DATA terminal equipment at the subscriber location to form a first DATA carrier;

means for combining the first DATA carrier and the first VF signals at the subscriber location to form said first VF DATA multiplexed signal;

means for separating said second VF DATA multiplexed signal from said central office DATA voice multiplexor into a second DATA carrier and second VF signals for the voice frequency equipment at the subscriber location;

and means for demodulating the second DATA carrier to produce said second DATA signals for the DATA terminal equipment at the subscriber location; and said central office DATA voice multiplexor comprising:

means for separating said first VF DATA multiplexed signal from said remote DATA voice multiplexor into the first VF signals and the first DATA carrier;

means for demodulating the first DATA carrier to recover said first DATA signals;

means for modulating the second DATA signals to form the second DATA carrier;

and means for combining the second DATA carrier and the second VF signals to produce the second VF DATA multiplexed signal;

the method comprising:

extinguishing the second DATA carrier corresponding to a given subscriber line circuit for a first preselected period of time;

and enabling loopbacks at preselected different locations between the subscriber loop and the DATA terminal equipment for preselected different loopback intervals which terminate subsequent to said first preselected period along the given subscriber line circuit upon the extinguishing of said second DATA carrier for said first preselected period.

31. A method in accordance with claim 30 wherein:
extinguishing of said DATA carrier continues beyond said first preselected period of time until a second preselected period of time is reached;
enabling said loopbacks further includes creating one or more further loopbacks along the corresponding subscriber line circuit upon the extinguishing of said second DATA carrier for said second preselected period;
and said loopback intervals terminate subsequent to said second preselected period.

32. A method in accordance with claim 31 wherein:
each subscriber line circuit of said system further includes:
a remote DATA voice multiplexor diagnostic block disposed between the corresponding remote DATA voice multiplexor and the corresponding DATA terminal equipment of the subscriber line circuit, said diagnostic block including first and second paths for coupling said first and second DATA signals between the corresponding DATA terminal equipment and the corresponding remote DATA voice multiplexor;
and the step of enabling loopbacks includes:
creating a loopback at the corresponding diagnostic block of the subscriber line circuit by coupling the first and second paths of the diagnostic block and by decoupling the first and second paths of the diagnostic block from the corresponding DATA terminal equipment for a first preselected loopback interval;
and creating a further loopback at the corresponding remote DATA voice multiplexor by coupling the second DATA signals recovered by the demodulating means of the remote DATA voice multiplexor to and decoupling the first DATA signals from the modulating means of the remote DATA voice multiplexor for a second preselected loopback interval which terminates prior to the first loopback interval.

33. A method in accordance with claim 32 wherein:
each subscriber line circuit of said system further includes:
a remote DATA voice repeater block disposed between the corresponding remote DATA voice multiplexor and the remote DATA voice multiplexor diagnostic block of the subscriber line circuit for regenerating the first and second DATA signals coupled therebetween, said repeater block including a first path for said first DATA signals and a second path for said second DATA signals;
and said step of enabling said loopbacks includes:
creating a loopback at the corresponding repeater block of the subscriber line circuit by coupling the first and second paths of the repeater block and by decoupling the first and second paths of the repeater block from the corresponding remote DATA voice multiplexor diagnostic block for a third preselected loopback interval which terminates prior to and subsequent to said first and second loopback intervals, respectively.

34. A method in accordance with claim 33 further including:
genertaing at the central office a first test signal during said second loopback interval, a second test signal after said second loopback interval and during said third loopback interval, and a third test signal after said third loopback interval and during said first loopback interval; and
transmitting the first, second and third test signals to the subscriber location.

35. A method in accordance with claim 30 wherein:
the step of extinguishing is carried out in the corresponding central office DATA voice multiplexor in response to a carrier kill signal.

36. A method in accordance with claim 35 wherein:
a carrier kill signal is able to be enabled at each said central office.

37. A method in accordance with claim 35 wherein:
each said central office of said system includes:
a statistical multiplexor for: producing a first DATA multiplexed signal from said first DATA signals and transmitting said first DATA multiplexed signal onto a DATA line; for demultiplexing a second DATA multiplexed signal containing said second DATA signals received from the DATA line to provide said second DATA signals; for generating a carrier kill signal for a corresponding subscriber line circuit in response to signals from said DATA line;
and said method further includes:
generating at a statistical multiplexor a carrier kill signal corresponding to a subscriber line circuit and coupling the carrier kill signal to the modulating means of the corresponding central office DATA voice multiplexor.

38. A method in accordance with claim 37 wherein:
said system further includes:
a DATA line coupling said statistical multiplexor to a packet switch;
a packet switch for receiving said first DATA multiplexed signal from and transmitting said second DATA multiplexed signal to said DATA line;
and a network control center for controlling operation of said packet switch and statistical multiplexor;
and said method further includes:
coupling a signal from said network control center through said packet switch to said DATA line for causing said multiplexor to generate a carrier kill signal.

* * * * *

UNITED STATES PATENT AND TRADEMARK OFFICE
CERTIFICATE OF CORRECTION

PATENT NO. : 4,660,194

DATED : Apr. 21, 1987

INVENTOR(S) : Carl A. Larson, Hamid Modarressi, John J. Moore

It is certified that error appears in the above-identified patent and that said Letters Patent is hereby corrected as shown below:

In the specification:

Col. 5, line 52, after "DATA" delete "signal"; and
          line 61, change "data" to --DATA signal--.
    Col. 7, line 23, "sytem" should be --system--.

In the claims:

Claim 1, line 5, "VP" should be --VF--.
    Claim 15, line 7, after "in" delete "the".
    Claim 17, line 12, "detection" should be --detecting--.
    Claim 25, line 1, change "diagnostic block" to --combination--.
    Claim 34, line 3, "genertaing" should be --generating--.

Signed and Sealed this
Seventeenth Day of November, 1987

Attest:

DONALD J. QUIGG

Attesting Officer        Commissioner of Patents and Trademarks